(12) United States Patent
Tang et al.

(10) Patent No.: US 9,535,796 B2
(45) Date of Patent: Jan. 3, 2017

(54) METHOD, APPARATUS AND COMPUTER FOR DATA OPERATION

(75) Inventors: Liang Tang, Beijing (CN); Changsheng Guo, Beijing (CN); Chunmei Liu, Beijing (CN); Yizun Guo, Beijing (CN)

(73) Assignees: BEIJING LENOVO SOFTWARE LTD., Beijing (CN); LENOVO (BEIJING) LIMITED, Beijing (CN)

(*) Notice: Subject to any disclaimer, the term of this patent is extended or adjusted under 35 U.S.C. 154(b) by 424 days.

(21) Appl. No.: 13/581,397

(22) PCT Filed: Mar. 30, 2011

(86) PCT No.: PCT/CN2011/000547
§ 371 (c)(1),
(2), (4) Date: Aug. 27, 2012

(87) PCT Pub. No.: WO2011/120335
PCT Pub. Date: Oct. 6, 2011

(65) Prior Publication Data
US 2012/0324186 A1 Dec. 20, 2012

(30) Foreign Application Priority Data
Mar. 30, 2010 (CN) .......................... 2010 1 0137051

(51) Int. Cl.
G06F 12/16 (2006.01)
G06F 11/14 (2006.01)
(Continued)

(52) U.S. Cl.
CPC ......... *G06F 11/1446* (2013.01); *G06F 12/109* (2013.01); *G06F 3/064* (2013.01);
(Continued)

(58) Field of Classification Search
CPC ............................ G06F 11/1402; G06F 11/14
See application file for complete search history.

(56) References Cited

U.S. PATENT DOCUMENTS 6,061,770 A * 5/2000 Franklin ............. G06F 11/1466
711/161
6,934,822 B2 * 8/2005 Armangau et al. ........... 711/162
(Continued)

FOREIGN PATENT DOCUMENTS

CN 1700189 A 11/2005
CN 101515276 A 8/2009

OTHER PUBLICATIONS

International Search Report dated Jul. 7, 2011 issued in PCT/CN2011/000000547.

*Primary Examiner* — Charles Rones
*Assistant Examiner* — Tian-Pong Chang
(74) *Attorney, Agent, or Firm* — Scully Scott Murphy & Presser

(57) ABSTRACT

A method, an apparatus and a computer for data operation are provided. The method includes: determining, when writing data to a sector of a storage device, whether the sector belongs to an old block for a restore point of the storage device. If so, the method further includes: allocating a new block and writing the data into the new block; creating a table including an address of the old block, an address of the new block and a first identifier, wherein the first identifier has first identification elements corresponding to the sector in the old block and in the new block, respectively, and wherein each of the first identification elements has a first state indicating to read data from the old block during data restoration in the sector and a second state indicating to read data from the new block during data restoration in the sector; and pointing the address of the old block in an address index table for the restore point to the created table. Otherwise, the
(Continued)

method further includes: allocating a new block and writing the data into the new block; and modifying the address of the old block in an address index table for the restore point into the address of the new block. With the present invention, the time required for operation on the sector for the restore point of the storage device can be saved, and the performance of the computer can be improved.

13 Claims, 5 Drawing Sheets

(51) Int. Cl.
    *G06F 12/10*     (2016.01)
    *G06F 3/06*     (2006.01)

(52) U.S. Cl.
    CPC .......... *G06F 11/14* (2013.01); *G06F 11/1402* (2013.01); *G06F 2201/84* (2013.01)

(56) References Cited

U.S. PATENT DOCUMENTS

| | | | |
|---|---|---|---|
| 7,035,881 B2* | 4/2006 | Tummala et al. | ............ 707/639 |
| 7,165,156 B1* | 1/2007 | Cameron | ............ G06F 11/1471 |
| | | | 707/999.202 |
| 7,870,356 B1* | 1/2011 | Veeraswamy et al. | ....... 711/162 |
| 7,886,119 B1* | 2/2011 | Cameron | ............. G06F 3/0611 |
| | | | 711/114 |
| 2005/0065986 A1* | 3/2005 | Bixby et al. | .................. 707/204 |
| 2006/0143412 A1* | 6/2006 | Armangau | .................... 711/162 |
| 2009/0083503 A1 | 3/2009 | Li et al. | |
| 2009/0144515 A1* | 6/2009 | Benari | ........................ 711/162 |

* cited by examiner

METHOD, APPARATUS AND COMPUTER FOR DATA OPERATION

TECHNICAL FIELD

The present invention relates to computer technology, and more particularly, to a method, apparatus and computer for data operation.

BACKGROUND

For computer storage device, QEMU Copy On Write (QCOW) is a method capable of supporting return to a restore point. In QCOW, a hard disk is managed in unit of Block. As shown in FIG. 1, L1 corresponds to Level 1 hard disk address page table in QCOW, and L2 corresponds to Level 2 hard disk address page table in QCOW. L1 and L2 are used to convert a virtual sector number into a physical sector number. Here, a virtual sector number is an address at which a User Operating System (UOS) accesses a virtual hard disk and reads/writes content on the virtual hard disk, while a physical sector number is a physical address of a hard disk sector. A block offset is an offset sector number of a virtual sector number within a block. A restore point is a hard disk state to which the computer storage device can return.

The QCOW uses a Copy On Write storage approach to write on a sector. After a restore point is set up, if a sector associated with the restore point is to be modified, it is necessary to copy, to a new block, data in an old block to which the sector belongs. Then, data to be written is written into the new block, and the address of the new block is recorded. In this way, each time such sector is to be written, data written into the old block needs to be copied to the new block, and then data to be written is written into the new block. When such sector is frequently written, the above copy operations will significantly degrade the performance of a computer.

A restore point corresponds to a virtual address index table, including a L1 table and a L2 table, as shown in FIG. 1. The L1 table can be referred to as Level 1 address index of the restore point, and the L2 table can be referred to as Level 2 address index of the restore point. The L1 table and the L2 table can be combined together into a single table which represents an address index of blocks for the restore point. During returning to the restore point, an access to a virtual hard disk address is converted into an access to a physical hard disk address with reference to the virtual address index table. In the conversion of addressing, an index corresponding to a physical address is obtained from the L1 and L2 tables for the latest restore point. If the corresponding address index is not found in the L1 and L2 tables, the tables for previous restore points are recursively searched until the corresponding index is found or all the restore points have been recursively searched.

SUMMARY

The object of the present invention is to provide a method, apparatus and computer for data operation, capable of avoiding copy operation during writing a sector of a storage device, thereby saving time for reading/writing operations and improving performance of the computer.

According to an embodiment of the present invention, a method for data operation is provided comprising: determining, when writing data to a sector of a storage device, whether the sector belongs to an old block for a restore point of the storage device; and if the sector belongs to the old block,
allocating a new block and writing the data into the new block;
creating a table including an address of the old block, an address of the new block and a first identifier, wherein the first identifier has first identification elements corresponding to the sectors in the old block and in the new block, respectively, and wherein each of the first identification elements has a first state indicating to read data from the old block during data restoration in the respective sector and a second state indicating to read data from the new block during data restoration in the respective sector; and
pointing the address of the old block in an address index table for the restore point to the created table; or
if the sector does not belong to the old block,
allocating a new block and writing the data into the new block; and
modifying the address of the old block in an address index table for the restore point into the address of the new block.

Preferably, the method further includes: during data restoration, reading data from the old block based on the address of the old block if the first identification element corresponding to the sector in the first identifier is in the first state, or from the new block based on the address of the new block if the first identification element is in the second state.

Preferably, when the sector belongs to the old block for the restore point of the storage device, the method further includes, after writing new data into the new block: adding a second identifier for the address of the old block in the address index table for the restore point, wherein the second identifier has a first state indicating to read data directly based on the address of the old block during data restoration and a second state indicating to read data based on the state of the first identification element of the first identifier in the table during data restoration.

Preferably, the method further includes: during data restoration, searching the address index table for the restore point of the storage device for an address of a block from which the data is to be read; reading the data directly based on the address of the block if the second identifier of the address is in the first state; reading the data based on the state of the corresponding first identification element of the first identifier in the table if the second identifier of the address is in the second state.

Preferably, when the sector belongs to the old block for the restore point of the storage device, the method further includes, after writing new data into the new block: writing, when writing further data into a sector in the new block, the further data into the new block directly and setting the first identification element corresponding to the sector in the table into the second state.

Preferably, if all of the first identification elements of the first identifier are in the second state, the data is directly read from the new block based on the address of the new block during data restoration.

Preferably, if all of the first identification elements of the first identifier are in the second state, the table is released.

Preferably, the step of reading the data from the old block based on the address of the old block includes: obtaining a physical address of the sector in the old block by adding an address offset for the sector in the old block to the address of the old block and reading the data in the sector based on the physical address of the sector; and the step of reading the data from the new block based on the address of the new block includes: obtaining a physical address of the sector in the new block by adding an address offset for the sector in the new block to the address of the new block and reading the data in the sector based on the physical address of the sector.

Preferably, the table is represented by a table of bitmaps or a structured data and the first identifier is represented by a bitmap.

According to an embodiment of the present invention, a method for writing data is provided comprising: allocating, when writing data into a sector of an old block for a restore point of a storage device, a new block and writing the data into the new block; creating a table including an address of the old block, an address of the new block and a first identifier, wherein the first identifier has first identification elements corresponding to the sector in the old block and in the new block, respectively, and wherein each of the first identification elements has a first state indicating to read data from the old block during data restoration in the sector and a second state indicating to read data from the new block during data restoration in the sector; and pointing the address of the old block in an address index table for the restore point to the created table.

According to an embodiment of the present invention, an apparatus for data operation is provided comprising: a writing module adapted to allocate, when writing data into a sector of an old block for a restore point of a storage device, a new block and write the data into the new block; a creating module adapted to create a table including an address of the old block, an address of the new block and a first identifier, wherein the first identifier has first identification elements corresponding to the sector in the old block and in the new block, respectively, and wherein each of the first identification elements has a first state indicating to read data from the old block during data restoration in the sector and a second state indicating to read data from the new block during data restoration in the sector; and a reading module adapted to during data restoration in a sector, read data from the old block based on the address of the old block if the first identification element corresponding to the sector in the first identifier is in the first state or from the new block based on the address of the new block if the first identification element is in the second state.

According to an embodiment of the present invention, a computer is provided comprising: a storage device; a virtual machine manager; a first operating system running on the virtual machine manager; a second operating system adapted to read/write the storage device using the first operating system and the virtual machine manager. The first operating system includes: a writing module adapted to allocate, when writing data into a sector of an old block for a restore point of the storage device, a new block and write the data into the new block; a creating module adapted to create a table including an address of the old block, an address of the new block and a first identifier, wherein the first identifier has first identification elements corresponding to the sector in the old block and in the new block, respectively, and wherein each of the first identification elements has a first state indicating to read data from the old block during data restoration in the sector and a second state indicating to read data from the new block during data restoration in the sector; and a reading module adapted to read, during data restoration in a sector, data from the old block based on the address of the old block if the first identification element corresponding to the sector in the first identifier is in the first state or from the new block based on the address of the new block if the first identification element is in the second state.

Preferably, the first operating system further includes: a releasing module adapted to read the data directly read from the new block based on the address of the new block and release the table if all of the first identification elements of the first identifier in the table are in the second state.

According to embodiments of the present invention, when writing a sector in an old block for an existing restore point, a table, such as a bitmap table, is created for indicating an address of the old block and an address of a newly allocated block (new block). During data restoration, data to be written into a new sector may be read from the new block, and data to be written into a sector of the old block may be read from the old block. In this way, when writing a new sector, it is unnecessary to copy data in the old block into the new block. Instead, data can be written directly into the new block, and the state of the first identifier can be recorded accordingly. When the entire block has been updated to have only new sectors, its index can be directly modified into indicate the addresses of the new blocks. In this way, time for writing operation can be saved, and the performance of the computer can be improved.

DETAILED DESCRIPTION OF THE PREFERRED EMBODIMENTS

In the following, the embodiments of the present invention will be further detailed with reference to the figures, such that the above objects, features and advantages of the present invention can become more apparent.

In the prior art, if a storage device is written in the Copy On Write manner, copy operations are always required when a sector is frequently written, which will significantly degrade the performance of the computer. According to the present invention, this problem can be solved by providing a method, apparatus and computer for data operation.

Figure 1:
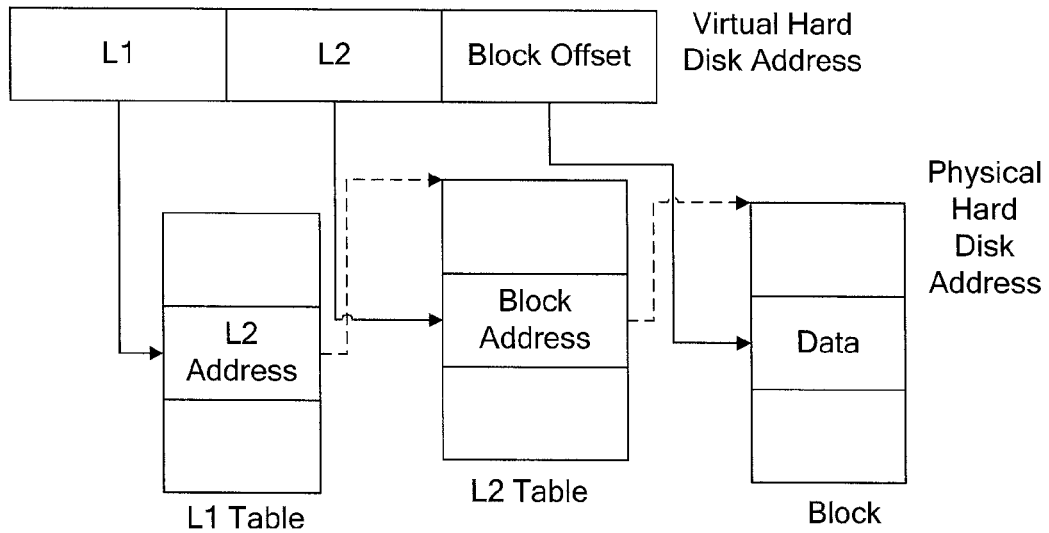
FIG. 1 is an address index table for a restore point in the prior art.
Figure 2:
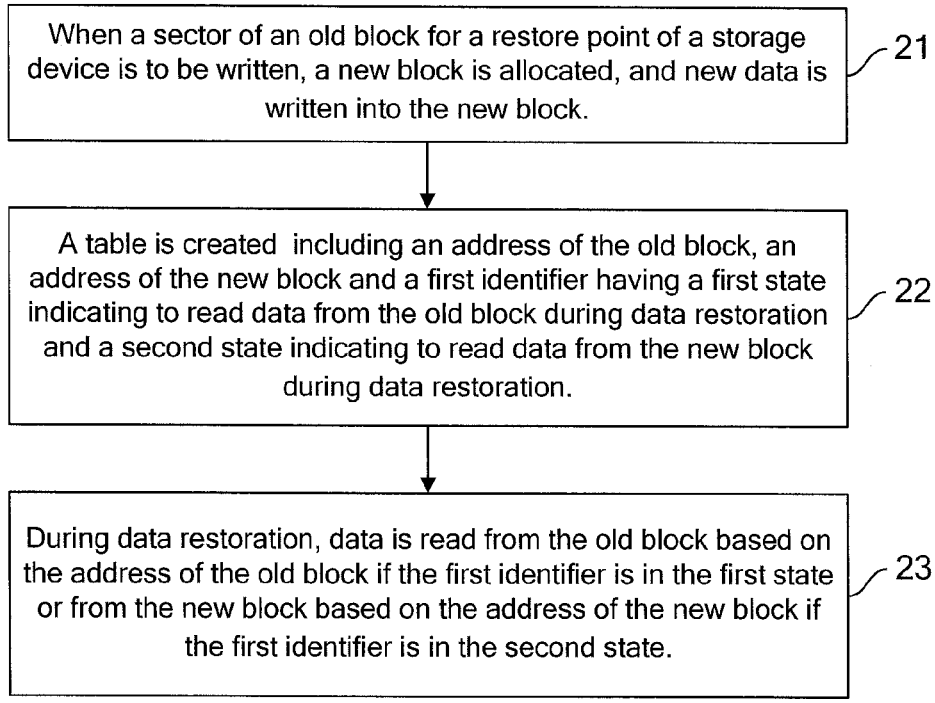
FIG. 2 is a flowchart illustrating a method for data operation according to an embodiment of the present invention.

Referring to FIG. 2, a method for data operation according to an embodiment of the present invention includes the following steps.

At step 21, when a sector of an old block for a restore point of a storage device is to be written, a new block is allocated, and new data can be written into the new block.

At step 22, a table is created which includes an address of the old block, an address of the new block and a first identifier. The first identifier has a first state indicating to read data from the old block during data restoration and a second state indicating to read data from the new block during data restoration.

At step 23, during data restoration, data is read from the old block based on the address of the old block if the first identifier is in the first state, or from the new block based on the address of the new block if the first identifier is in the second state.

Herein, in this embodiment, the table created in the step 22 can be in a form of bitmap table. The bitmap table includes the address of the old block, the address of the new block, and a bitmap which corresponds to the above first identifier and has a first state indicating to read data from the old block during data restoration and a second state indicating to read data from the new block during data restoration. Alternatively, the table can be represented as a structured data. Here, the structured data may have an element 1 representing the address of the old block, an element 2 representing the address of the new block and an element 3 representing the above first identifier. In various embodiments of the present invention, the table can be represented in other different forms.

According to the method of this embodiment, when a sector of an old block for an existing restore point is to be written, a table is created representing the address of the old block, the address of the new block, and the first identifier indicating which sectors are newly written sectors and which are sectors of the old block. During data restoration, the newly written sectors are to be read from the new block, and the sectors of the old block are to be read from the old block. In this way, when a new sector is to be written, the new block can be written directly, and the state of the first identifier can be recorded accordingly, without copying the sectors of the old block into the new block. When a block has been updated entirely to only have newly written sectors, the block's index can be directly modified into the address of a new block. In this way, the writing time can be saved, and the performance of the computer can be improved.

Here, if the table is a bitmap table as described above, the first state of the bitmap (i.e., the first identifier) in the bitmap table can be denoted by 0 and the second state can be denoted by 1, or vice versa, to indicate which sectors are newly written sectors and which are sectors of the old block. For example, the data can be read from the new block when the bitmap is 1 and from the old block when the bitmap is 0.

Figure 3:
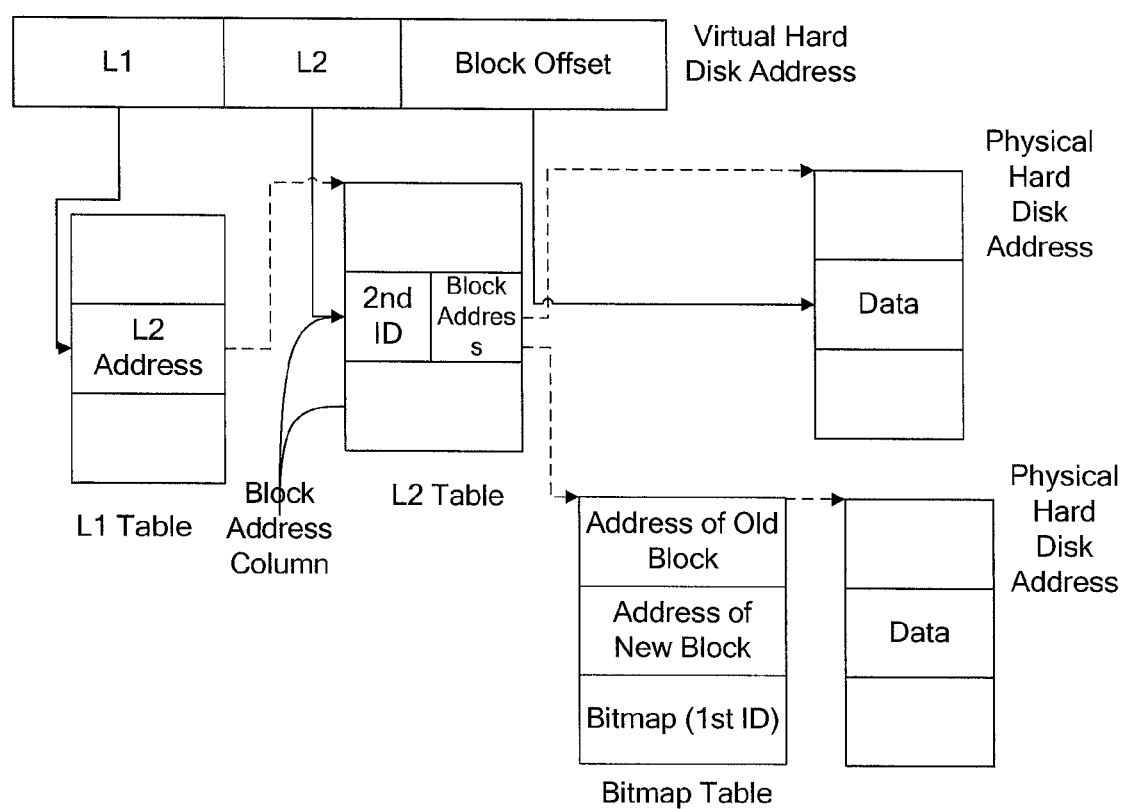
FIG. 3 is an address index table for a restore point according to an embodiment of the present invention.

As shown in FIG. 3, each restore point corresponds to a virtual address index table which includes an L1 table, an L2 table and a block offset. The L1 table stores an address of an L2 page table. The L2 table stores an address of a block. The block offset is an offset sector number of a virtual sector number within a block. The L1 and L2 tables can be combined into a single table representing a virtual address index for the restore point.

Here, when a sector of an old block for an existing restore point is to be written, in addition to retaining the contents in the old block, new data needs to be recorded/written. In this case, a new block is allocated and the new data are written into a sector of the new block. In this way, during data restoration, it is possible to read the newly written data from the new block and read the previously written data from the old block. The above method further includes the following process after the new data is written into the new block.

A second identifier is added for the address of the old block in the address index table for the restore point (such as the block address column in the L2 table as shown in the figure). The second identifier also has a first state indicating to read data directly based on the address of the old block during data restoration and a second state indicating to read data based on the state of the first identifier in the table during data restoration.

If the second identifier is represented by a bit, for example, named as DIRECTLY, the DIRECTLY of value 1 (indicating the above first state of the second identifier, which can also be represented by any other number or value) indicates that a physical address of a sector can be derived directly from a corresponding block address in the block address column and a corresponding block offset, in order to read the sector. On the other hand, the DIRECTLY of value 0 (indicating the above second state of the second identifier, which can also be represented by any other number or value) indicates to read data from an old block or from a new block, depending on the state of the bitmap in the bitmap table.

The above method can further include the following process after the new data has been written into the new block.

If further data is to be written into a sector in the new block, the further data is written into the new block directly, and the first identifier corresponding to the new block in the table is set into the second state.

If further data is to be written into a sector in the new block, the further data can be written directly into the new block. When data is to be restored from the block, the physical address of the sector can be derived from the address of the new block and the block offset, such that the data can be read from the sector based on the physical address of the sector.

In the above method, if all the identifiers in the table are in their second state, which means that all the sectors in the block for the restore point have been rewritten, data can be read directly from the sectors of the new block based on the address of the new block during data restoration.

In particular, if bits of all the bitmaps in the bitmap table are 1, which means that all the sectors in the block to be restored are newly written sectors, the physical addresses of the sectors can be derived from the address of the new block and block offsets, such that data can be read from the sectors based on the physical addresses of the sectors during data restoration.

Further, in the above method, in the step 23, reading the data from the old block based on the address of the old block includes obtaining a physical address of the sector in the old block by adding an address offset for the sector in the old block to the address of the old block, and reading the data in the sector based on the physical address of the sector. Further, reading the data from the new block based on the address of the new block includes obtaining a physical address of the sector in the new block by adding an address offset for the sector in the new block to the address of the new block, and reading the data in the sector based on the physical address of the sector.

In the following, more detailed implementations of the above method according to the present invention will be explained with reference to a process flow. The above method can be divided into a writing process flow and a reading process flow.

Figure 4:
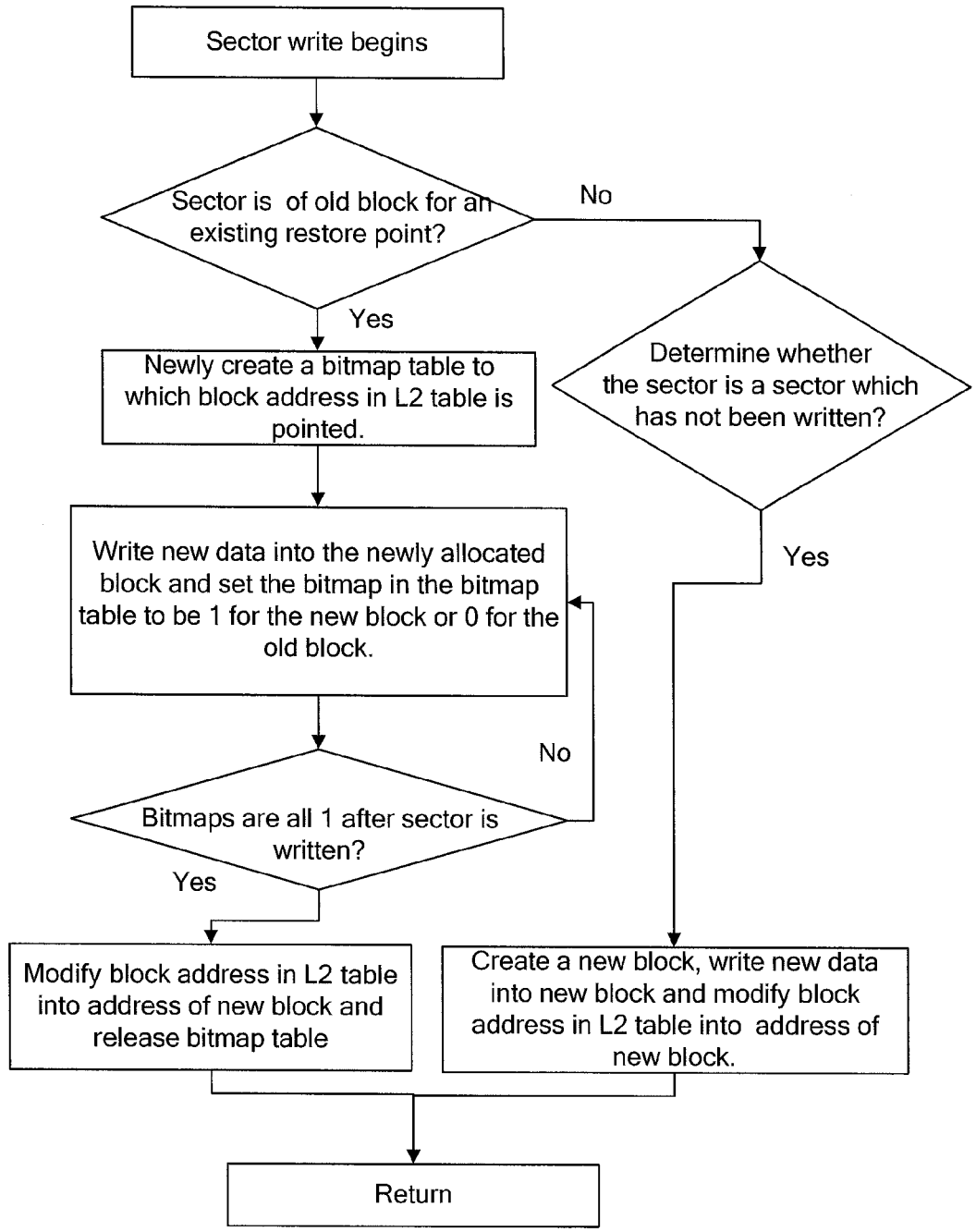
FIG. 4 is a flowchart illustrating a method for writing data for a restore point of a storage device according to the method shown in FIG. 2.

As shown in FIG. 4, an embodiment of the present invention relates to a method for writing data in a sector for a restore point of a storage device. The method includes the following steps.

At step 41, when a sector of an old block for a restore point of a storage device is to be written, a new block is allocated, and new data can be written into the new block.

At step 42, a table is created which includes an address of the old block, an address of the new block and a first identifier. The first identifier has a first state indicating to read data from the old block during data restoration and a second state indicating to read data from the new block during data restoration.

At step 43, the address of the old block in an address index table for the restore point is pointed to the created table.

Herein, the table created in the above step 42 can be in a form of bitmap table. The bitmap table includes the address of the old block, the address of the new block and a bitmap which corresponds to the above first identifier and has a first state indicating to read data from the old block during data restoration and a second state indicating to read data from the new block during data restoration. Alternatively, the table can be represented as a structured data. Here, the structured data has an element 1 representing the address of the old block, an element 2 representing the address of the new block and an element 3 representing the above first identifier. According to various embodiment of the present invention, the table can be represented in other different forms.

The above writing process is explained with the following example.

The process of writing a sector begins.

It is determined whether the sector is a sector of an old block for an existing restore point, i.e., whether any data has been written into the sector.

If the sector is a sector of an old block for an existing restore point, and is not a new block which is written for the first time for a new restore point, a new bitmap table is created, and a block address in the L2 table is pointed to the bitmap table. This bitmap table includes the address of the old block, the address of the new block and a bitmap. Here, the address of the new block is pointed to the new block, and the address of the old block is pointed to the old block. During data restoration, the newly written data is read from the new block, and the previously existing data is read from the old block.

A new block is allocated and new data is written into the new block. The bitmap in the bitmap table is set such that the state of the bitmap is set to be 1 for the new block or 0 for the old bock. During data restoration, it is determined from the state of the bitmap in the bitmap table whether the data is to be read from the new block or the old block. If the state of the bitmap is 1, the data is read from the new block. If the state of the bitmap is 0, the data is read from the old block.

After the sector is written, it is determined whether the states of the bitmaps are all 1. If so, the block address in the L2 table is modified into the address of the new block and the bitmap table is released.

If the newly written sector is not a sector for an existing restore point, i.e., is a sector which has not been written, a new block is allocated and new data is written into the new block. The block address in the L2 table is modified into the address of the new block.

If the sector to be written is not a block which is written for the first time for a new restore point, a second identifier bit (DIRECTLY bit) for the block address data is determined.

If the DIRECTLY bit is 1, it is indicated that the block can be written directly into.

If the DIRECTLY bit is 0, the location of the bitmap table and the address of the new block are found based on the block address in the block address column. Then, the new data is written into the new block, and the bitmap in the bitmap table is set.

Figure 5:
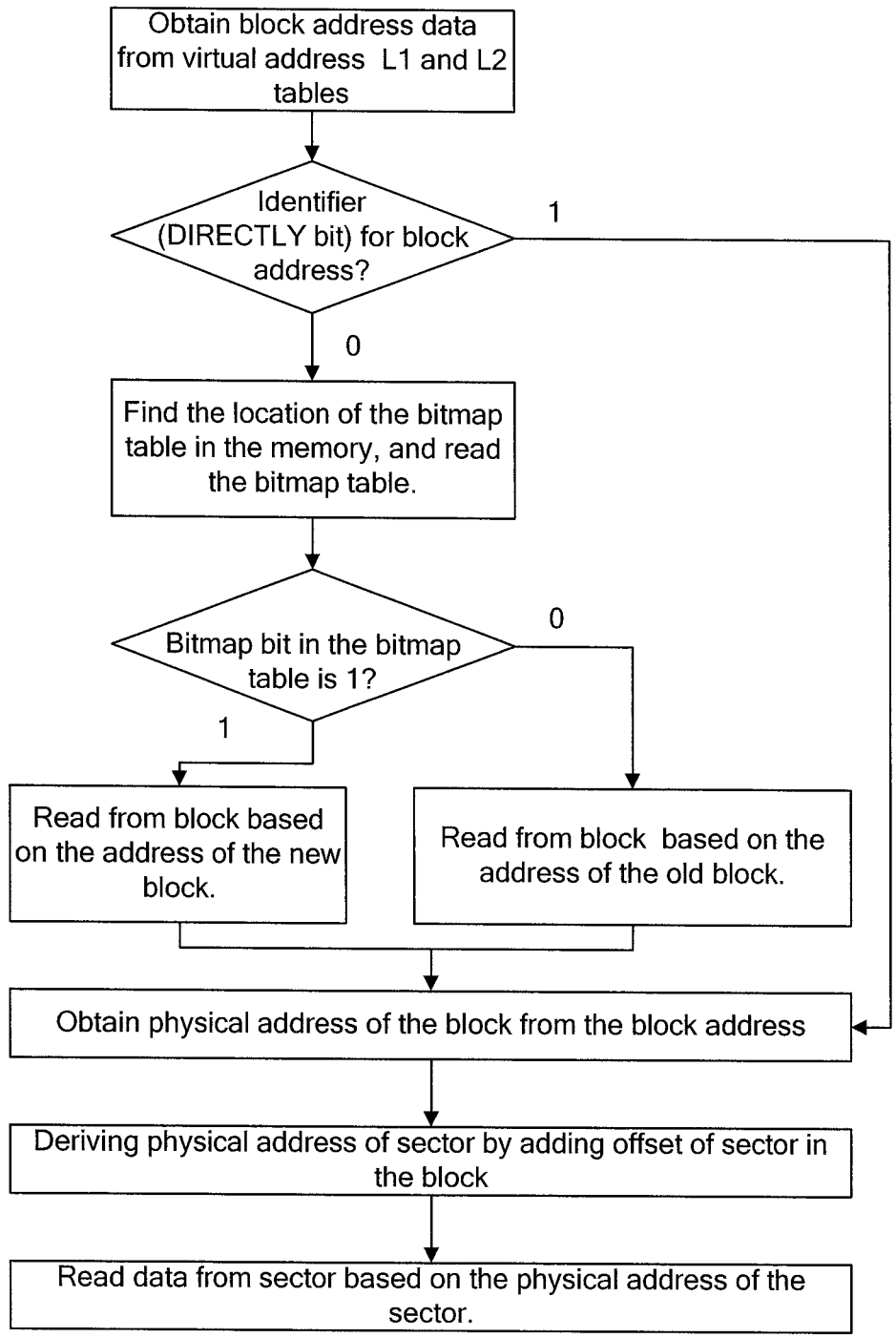
FIG. 5 is a flowchart illustrating a method for reading data for a restore point of a storage device according to the method shown in FIG. 2.

As shown in FIG. 5, an embodiment of the present invention relates to a method for reading data in a sector for a restore point of a storage device. The method includes the following steps.

At step 51, the address index table for the restore point of the storage device is searched for an address of a block to be restored.

At step 52, if the second identifier for the address of the block to be restored indicates that the address of the block is pointed to a table, data is read from the old block based on the address of the old block in the table according to the first state of the first identifier in the table, or from the new block based on the address of the new block according to the second state of the first identifier. Further, if the second identifier for the block to be restored indicates that the address of the block is pointed directly to a physical sector of the block, the data is directly read from the physical sector corresponding to the block based on the address of the block.

The table in the step 52 is the same as the table created in the step 42 as shown in FIG. 4.

The above reading process can be explained using the following example.

A block address column in the L2 table is obtained from the virtual address L1 and L2 tables.

The second identifier (DIRECTLY bit) for the block address data is determined.

If the DIRECTLY bit is 1 (i.e., the first state of the second identifier), it is indicated that data can be read directly from the block.

If the DIRECTLY bit is 0 (i.e., the second state of the second identifier), the location of the bitmap table can be found based on the block address in the block address column, and the bitmap table is read.

It is determined whether the bitmap in the bitmap table is 1. If so (i.e., the second state of the first identifier), the data is read from the new block based on the address of the new block in the bitmap table. In particular, the physical address of the sector in the new block can be derived from the address of the new block and the block offset, such that the data in the sector can be read based on the physical address of the sector.

If the bitmap is 0 (i.e., the first state of the first identifier), the data is read from the old block based on the address of the old block in the bitmap table. In particular, the physical address of the sector in the old block can be derived from the address of the old block and the block offset, such that the data in the sector can be read based on the physical address of the sector.

In the above solutions, when a new sector is to be written, it is not necessary to copy content in the old block to the new block. Instead, the new block can be directly written and the address of the block and the state of the newly written first identifier can be recorded. In this way, the time required for writing a sector can be saved, and the performance of the computer can be improved. When the block is entirely updated to only have newly written sectors, the block address column in the index L2 table can be directly modified into the address of the new block. At the same time, the content in the block can be updated as a background procedure or while the computer is being powered off. Then, the block address index in the L2 table can be modified into the address of the new block.

Figure 6:
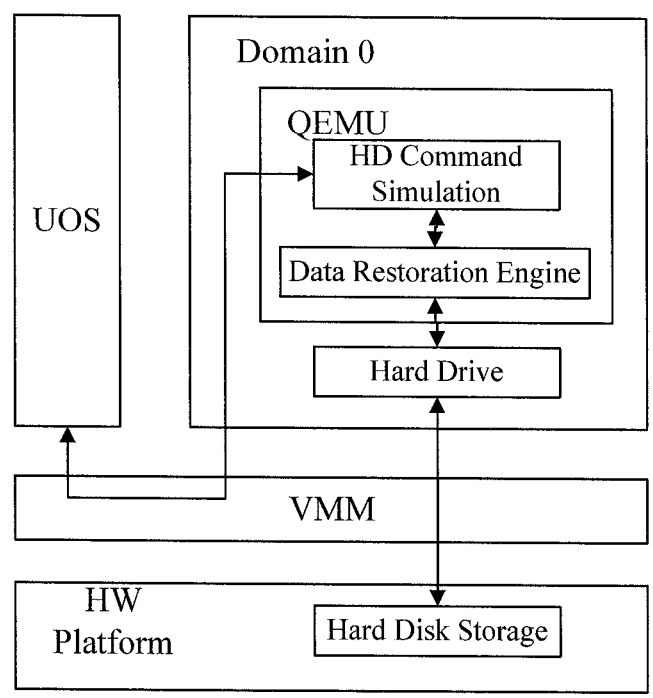
FIG. 6 is a block diagram of an implementation of a computer according to an embodiment of the present invention.

As shown in FIG. 6, an embodiment of the present invention relates to a computer, which includes:

a storage device, such as a hard disk storage device; a virtual machine manager (VMM);

a first operating system (such as Domain 0) running on the virtual machine manager;

a second operating system (such as User Operating System (UOS)) adapted to read/write the storage device using the first operating system and the virtual machine manager;

wherein the first operating system comprises:

a writing module adapted to allocate, when writing data into a sector of an old block for a restore point of the storage device, a new block and write the data into the new block;

a creating module adapted to create a table including an address of the old block, an address of the new block and a first identifier having a first state indicating to read data from the old block during data restoration and a second state indicating to read data from the new block during data restoration; and a reading module adapted to, during data restoration, read the data from the old block based on the address of the old block if the first identifier is in the first state or from the new block based on the address of the new block if the first identifier is in the second state.

Herein, the table created by the creating module can be in a form of bitmap table. The bitmap table includes the address of the old block, the address of the new block and a bitmap which corresponds to the above first identifier and has a first state indicating to read data from the old block during data restoration and a second state indicating to read data from the new block during data restoration. Alternatively, the table can be represented as a structured data. Here, the structured data has an element 1 representing the address of the old block, an element 2 representing the address of the new block and an element 3 representing the above first identifier. According to various embodiment of the present invention, the table can also be represented in other different forms.

The first operating system further includes: a releasing module adapted to read the data directly read from the new block based on the address of the new block, and release the table if all of the first identifiers in the bitmap table are in the second state.

All of the above writing module, creating module, reading module and releasing module can be in a data restoration engine module in Domain 0. In particular, the process for writing a sector can include the following steps.

The UOS has a writing access to a sector.

A QEMU simulates a writing command.

The QEMU writes a virtual sector.

A QCOW (data restoration engine) searches the L1 and L2 tables for the address of the block to which the virtual sector belongs.

An address column of the block to which the virtual sector belongs is found in the L2 table.

It is determined whether the virtual sector has been written.

If so, a new bitmap table is created in the memory and the block address in the L2 table is pointed to the bitmap table.

A new block is allocated and new data is written into the new block. The bitmap in the bitmap table is set to be 1 for the new block or 0 for the old block.

After the sector is written, it is determined whether the bitmaps are all 1. If so, the block address in the L2 table can be modified into the address of the new block and the bitmap table can be released.

If the newly written sector is not a sector for an existing restore point, i.e., is a sector which has not been written, a new block is allocated and new data is written into the new block. The block address in the L2 table is modified into the address of the new block.

After the QCOW writing operation is completed, the QEMU returns the result corresponding to the writing operation to the UOS.

The process for reading a sector can include the following steps.

The UOS has a reading access to the sector.

A QEMU simulates a reading command.

The QEMU reads a virtual sector.

The QCOW indexes the address of the virtual sector, i.e., searches the L1 and L2 tables for the address of the block to which the virtual sector belongs.

An address column of the block to which the virtual sector belongs is found in the L2 table.

The second identifier (DIRECTLY bit) of the block address column is determined.

If the DIRECTLY bit is 1, it is indicated that data can be read directly from the sector in the block.

If the DIRECTLY bit is 0, the location of the bitmap table can be found in the memory based on the block address in the block address column, so as to read the bitmap table.

It is determined whether the bitmap in the bitmap table is 1. If so, the data is read from the new block based on the address of the new block in the bitmap table. In particular, the physical address of the sector in the new block can be derived from the address of the new block and the block offset, such that the data in the sector can be read based on the physical address of the sector.

If the bitmap is 0, the data is read from the old block based on the address of the old block in the bitmap table. In particular, the physical address of the sector in the old block can be derived from the address of the old block and the block offset (offset of the sector in the block), such that the data in the sector can be read based on the physical address of the sector.

After the QCOW reading operation is completed, the QEMU returns the corresponding result to the UOS.

In this embodiment, when a new sector is to be written, new data can be directly written into the new block. In addition, the address of the new block and the state of the bitmap for the new block can be recorded in the bitmap table. In data restoration (i.e., in reading a sector), the new data can be read from the new block and the old data can be read from the old block. The read data can be combined together such that the hard disk can be restored to the same state as that after the sector of the old block is written. In this process, it is not necessary to copy the content in the old block to the new block. In this way, the time required for the writing operation can be saved, and the performance of the computer can be improved. When the block is updated to newly written sectors, the block address column in the index L2 table can be directly modified into the address of the new block. The content in the block can be updated as a background procedure or while the computer is being powered off. Then, the block address index in the L2 table can be modified into the address of the new block.

An embodiment of the present invention relates to an apparatus for data operation in a storage device corresponding to the method described above with reference to FIG. 2. The apparatus includes:

a writing module adapted to allocate, when writing data into a sector of an old block for a restore point of a storage device, a new block and write the data into the new block;

a creating module adapted to create a table including an address of the old block, an address of the new block and a first identifier having a first state indicating to read data from the old block during data restoration and a second state indicating to read data from the new block during data restoration; and a reading module adapted to, during data restoration, read data from the old block based on the address of the old block if the first identifier is in the first state or from the new block based on the address of the new block if the first identifier is in the second state.

Here, the table created by the above creating module can be the same as the table created by the creating module of the computer as described earlier. In particular, the table can be a bitmap table.

In particular, the writing module can perform the writing process as shown in FIG. 4 and the reading module can perform the reading process as shown in FIG. 5. Again, when a new sector is to be written, new data can be directly written into the new block. In addition, the address of the new block and the state of the bitmap for the new block can be recorded in the bitmap table. During data restoration (i.e., in reading a sector), the new data can be read from the new block and the old data can be read from the old block. The read data can be combined together such that the hard disk can be restored to the same state as that after the sector of the old block is written. In this way, it is not necessary to copy the content of the old block to the new block such that, the time required for the writing operation can be saved, and the performance of the computer can be improved.

The preferred embodiments of the present invention have been described above. It should be noted that a number of variations and modifications can be made by those skilled in the art without departing from the principle of the present invention. These variations and modifications are to be encompassed by the scope of the present invention.

What is claimed is:

1. A method for data operation, comprising:
   determining, when writing data to a sector of a storage device, whether the sector belongs to an old block for a restore point of the storage device; and
   when it is determined that the sector belongs to the old block,
      allocating a new block and writing the data into the new block;
      creating a table including an address of the old block, an address of the new block and a first identifier having a plurality of first identification elements corresponding to the sectors in the old block and in the new block;
      setting each of the first identification elements to a first state or a second state, the first state indicating that the sector corresponding to the first identification element belongs to the old block and that data is read from the old block during data restoration and the second state indicating that the sector corresponding to the first identification element belongs to the new block and that data is read from the new block during data restoration; and
      pointing the address of the old block in an address index table for the restore point to the created table; or
   when it is determined that the sector does not belong to the old block,
      allocating a new block and writing the data into the new block; and
      modifying the address of the old block in an address index table for the restore point into the address of the new block, wherein each restore point corresponds to an address index table which includes an L1 table, an L2 table and a block offset, wherein the L1 table stores an address of an L2 page table, the L2 table stores an address of the block, and the block offset is an offset sector number of a virtual sector number within the block.

2. The method of claim 1, further comprising:
   during data restoration in a sector, reading the data from the old block based on the address of the old block when the first identification element corresponding to the sector in the first identifier is in the first state, or reading the data from the new block based on the address of the new block when the first identification element is in the second state.

3. The method of claim 1, wherein when the sector belongs to the old block for the restore point of the storage device, the method further comprises, after writing new data into the new block:
   adding a second identifier for the address of the old block in the address index table for the restore point, wherein the second identifier has a first state indicating to read data directly based on the address of the old block during data restoration and a second state indicating to read data based on the state of the first identification element of the first identifier in the table during data restoration.

4. The method of claim 3, further comprising:
   during data restoration, looking up the address index table for the restore point of the storage device for an address of a block from which the data is to be read;
   reading the data directly based on the address of the block when the second identifier of the address is in the first state;
   reading the data based on the state of the corresponding first identification element of the first identifier in the table when the second identifier of the address is in the second state.

5. The method of claim 1, wherein when the sector belongs to the old block for the restore point of the storage device, the method further comprises, after writing new data into the new block:
   when writing further data into a sector in the new block, writing the further data into the new block directly, and setting the first identification element corresponding to the sector in the table into the second state.

6. The method of claim 1, wherein when all of the first identification elements of the first identifier are in the second state, data is directly read from the new block based on the address of the new block during data restoration.

7. The method of claim 1, wherein when all of the first identification elements of the first identifier are in the second state, the table is released.

8. The method of claim 2, wherein the step of reading the data from the old block based on the address of the old block comprises: obtaining a physical address of the sector in the old block by adding an address offset for the sector in the old block to the address of the old block, and reading the data in the sector based on the physical address of the sector; and
   the step of reading the data from the new block based on the address of the new block comprises: obtaining a physical address of the sector in the new block by adding an address offset for the sector in the new block to the address of the new block, and reading the data in the sector based on the physical address of the sector.

9. The method of claim 1, wherein the table is represented by a table of bitmaps or structured data, and the first identifier is represented by a bitmap.

10. A method for writing data, comprising:

when writing data into a sector of an old block for a restore point of a storage device, allocating a new block and writing the data into the new block;

creating a table including an address of the old block, an address of the new block and a first identifier having a plurality of first identification elements corresponding to the sector in the old block and in the new block;

setting each of the first identification elements to a first state or a second state, the first state indicating that the sector corresponding to the first identification element belongs to the old block and that data is read from the old block during data restoration and the second state indicating that the sector corresponding to the first identification element belongs to the new block and that data is read from the new block during data restoration in the respective sector; and pointing the address of the old block in an address index table for the restore point to the created table, wherein each restore point corresponds to an address index table which includes an L1 table, an L2 table and a block offset, wherein the L1 table stores an address of an L2 page table, the L2 table stores an address of the block, and the block offset is an offset sector number of a virtual sector number within the block.

11. An apparatus for data operation, comprising:

a writing module adapted to allocate, when writing data into a sector of an old block for a restore point of a storage device, a new block and write the data into the new block;

a creating module adapted to create a table including an address of the old block, an address of the new block and a first identifier having a plurality of first identification elements corresponding to the sector in the old block and in the new block;

the creating module further adapted to set each of the first identification elements to a first state or a second state, the first state indicating that the sector corresponding to the first identification element belongs to the old block and that data is read from the old block during data restoration and the second state indicating that the sector corresponding to the first identification element belongs to the new block and that data is read from the new block during data restoration; and a reading module adapted to read, during data restoration in a sector, data from the old block based on the address of the old block when the first identification element corresponding to the sector in the first identifier is in the first state, or from the new block based on the address of the new block when the first identification element is in the second state, wherein each restore point corresponds to an address index table which includes an L1 table, an L2 table and a block offset, wherein the L1 table stores an address of an L2 page table, the L2 table stores an address of the block, and the block offset is an offset sector number of a virtual sector number within the block.

12. A computer, comprising:

a storage device;

a virtual machine manager;

a first operating system running on the virtual machine manager;

a second operating system adapted to read/write the storage device via the first operating system and the virtual machine manager;

wherein the first operating system comprises:

a writing module adapted to allocate, when writing data into a sector of an old block for a restore point of the storage device, a new block and write the data into the new block;

a creating module adapted to create a table including an address of the old block, an address of the new block and a first identifier having a plurality of first identification elements corresponding to the sector in the old block and in the new block;

the creating module further adapted to set each of the first identification elements to a first state or a second state indicating to read data from the old block during data restoration in the respective sector and a second state indicating to read data from the new block during data restoration in the respective sector; and a reading module adapted to read, during data restoration in a sector, data from the old block based on the address of the old block when the first identification element corresponding to the sector in the first identifier is in the first state, or from the new block based on the address of the new block when the first identification element is in the second state, wherein each restore point corresponds to an address index table which includes an L1 table, an L2 table and a block offset, wherein the L1 table stores an address of an L2 page table, the L2 table stores an address of the block, and the block offset is an offset sector number of a virtual sector number within the block.

13. The computer of claim 12, wherein the first operating system further comprises:

a releasing module adapted to read data directly from the new block based on the address of the new block and release the table, when all of the first identification elements of the first identifier in the table are in the second state.

* * * * *